US006370809B1

(12) United States Patent
Drew et al.

(10) Patent No.: US 6,370,809 B1
(45) Date of Patent: Apr. 16, 2002

(54) FISHING ALARM

(76) Inventors: Clarence Keith Drew; Stacy Pete Sokoloski, both of Circle Body Works, P.O. Box 54, Circle, MT (US) 59215

(*) Notice: Subject to any disclaimer, the term of this patent is extended or adjusted under 35 U.S.C. 154(b) by 0 days.

(21) Appl. No.: 09/558,509

(22) Filed: Apr. 26, 2000

Related U.S. Application Data

(60) Provisional application No. 60/130,938, filed on Apr. 26, 1999.

(51) Int. Cl.$^7$ ............................................ A01K 97/12
(52) U.S. Cl. ........................................................ 43/17
(58) Field of Search ............................ 43/4.5, 17, 25; 441/8

(56) References Cited

U.S. PATENT DOCUMENTS

| 75,075 A | 3/1868 | Talbot |
| 2,775,053 A | 12/1956 | Knoll et al. |
| 2,947,105 A | 8/1960 | Lagios |
| 3,023,532 A | 3/1962 | Gorenty |
| 3,049,733 A | * 8/1962 | Mennenga ..................... 441/8 |
| 3,334,364 A | * 8/1967 | Foss ............................... 441/8 |
| 3,420,206 A | * 1/1969 | Pelger ............................ 441/8 |
| 4,125,957 A | * 11/1978 | Cunningham .................. 43/17 |
| 4,552,318 A | 11/1985 | Durham |
| 4,823,496 A | * 4/1989 | Powell ........................ 43/17.5 |
| 5,495,688 A | * 3/1996 | Sondej et al. .................. 43/16 |
| 5,881,488 A | * 3/1999 | Canepa ......................... 43/4.5 |

* cited by examiner

Primary Examiner—Kurt Rowan
(74) Attorney, Agent, or Firm—Richard C. Litman

(57) ABSTRACT

A fish alarm device for operating as an indicator to a fisherman that a fish has bitten or has been caught. The device is comprised of a plastic bottle, preferably a 16 oz. soda bottle, a string attached to the mouth of the bottle, and a closure device attached to the opposite end of the string that latches onto an eyelet of a fishing pole. The bottle can also be luminescent for night fishing.

4 Claims, 4 Drawing Sheets

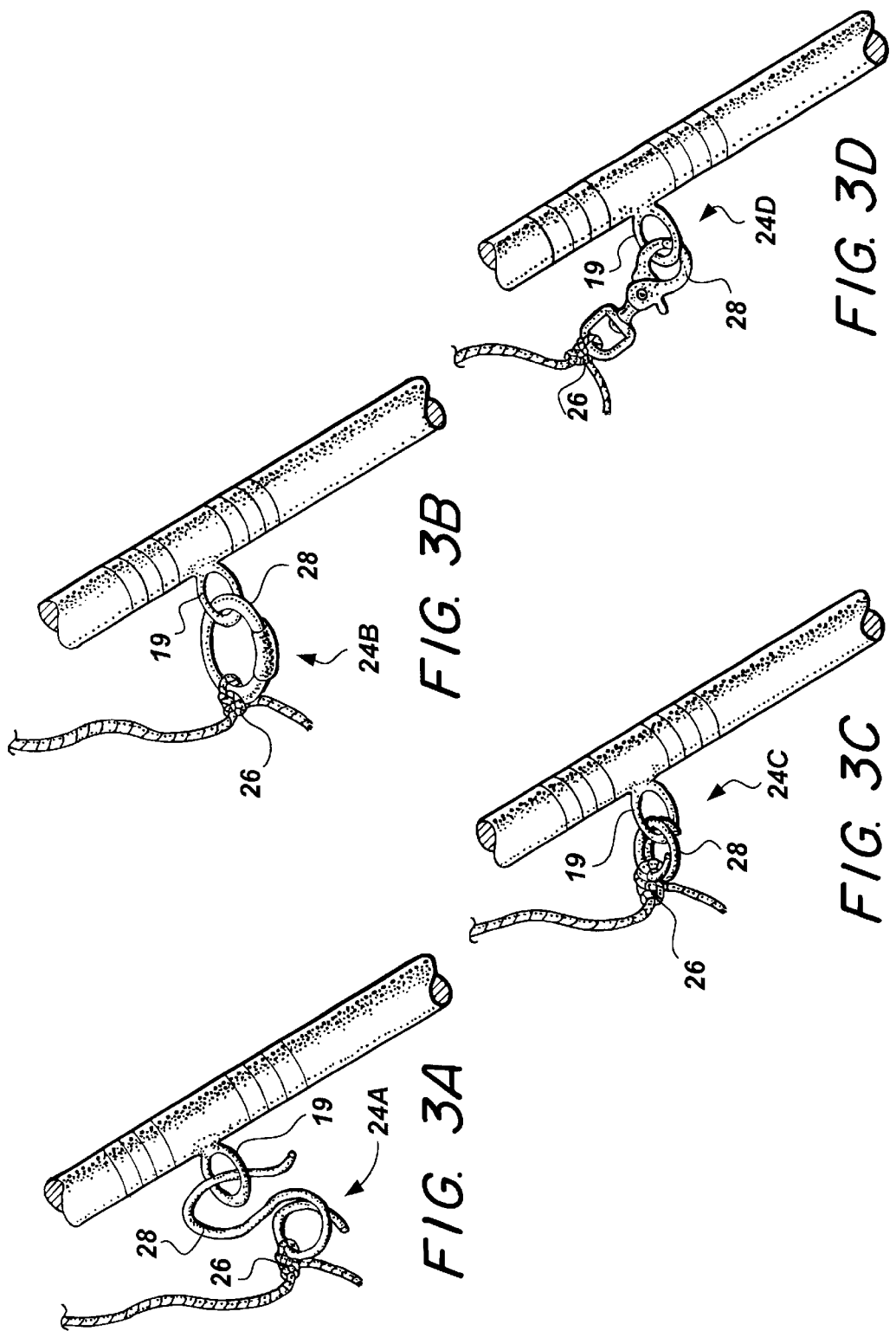

FISHING ALARM

CROSS-REFERENCE TO RELATED APPLICATION

This application claims the benefit of U.S. Provisional Patent Application Serial No. 60/130,938, filed Apr. 26, 1999.

BACKGROUND OF THE INVENTION

1. Field of the Invention

The present invention relates generally to fishing signaling devices. More specifically, the invention is an economical, simplified fish bite indicator on a fishing pole.

2. Description of Related Art

There are a number of prior art fishing devices that indicate the presence of a fish, including corks, floats, and bobbers. Such devices depend on being pulled downwardly against the buoyancy of the water to give an indication of a strike by a fish. Such indicators are difficult to detect particularly in choppy waters. To deal with this difficulty, other prior art devices have been made for indicating a strike or a bite which are mounted on a rod and supported in the air. However, such prior art devices have been relatively cumbersome and complex, or unduly expensive or difficult to adapt to standard fishing equipment. Other prior art devices rely on the fishing line to provide the connection to the signal. This is inconvenient because the line can get caught or tangled about the indicator.

By the present invention, a fishing pole is adapted with a very simple, inexpensive, quickly and easily detachable from the pole, lightweight, easy to use, and highly effective indicator that can be used during the day or in the evening, and it can be seen from up to 100 yards away.

The relevant art of interest will be discussed in the order of perceived relevance to the present invention.

U.S. Pat. No. 75,075 issued on Mar. 3, 1868, for D. C. Talbot describes a weight C attached by a spring i on a pin j to the end of a pole and to a flag-staff B-B' of a signal flag D. A staple h proximate the reel F still holds the line when it is tripped by a fish caught on the line. The fish signaling system is distinguishable for requiring a flag to be tripped up by the weight, spring and pin structure.

U.S. Pat. No. 2,775,053 issued on Dec. 25, 1956, for Paul H. Knoll et al. describes a signal for fishing rods combined with a pivotally connected bipod having rod clamping jaws and a flexible metal signal arm with an offset keeper portion at its distal end and a pennant attached to one leg of the bipod. The signal arm is looped over one handle grip of the locked reel for release of the pennant by the line being taken out by a hooked fish. The fishing rod signal device is distinguishable for its required pennant, bipod support and a flexible metal signal arm.

U.S. Pat. No. 4,552,318 issued on Nov. 12, 1985, for B. Elwood Durham describes a fish strike indicator comprising a closed face reel having its line opening modified to affix by epoxy glue a cylindrical member and an optional metal eyelet. A fish strike indicator body consisting of an inverted cup-shaped element with a large hole is placed on a slack portion of the fishing line proximate the reel. As the fish strikes and draws the line taut, the fish strike indicator cup returns to the reel to frictionally fit the tubular member with or without the flanged metal eyelet. The fish strike indicator system is distinguishable for requiring a modified open face reel with the integral tubular member, and the friction fitting fish strike indicator cup and the optional metal eyelet.

U.S. Pat. No. 3,023,532 issued on Mar. 6, 1962, for Earl L. Gorenty describes a bite signal for night fishing comprising a hollow spherical bobber with its upper hemisphere coated with light-reflecting material. The bobber has a bifurcated grip on top for gripping the extended fishing line while bobbing on the water and an eyed shank at its opposite end for attaching a line to an anchor wing on a forked support stake for propping the fishing pole. When the fish strikes by being attracted by the light-reflecting bobber, the bobber is released. The bite signal system is distinguishable for its required light-reflecting bobber.

U.S. Pat. No. 2,947,105 issued on Aug. 2, 1960, for Thomas L. Lagios describes a fish signal device comprising a two-piece bobber having threadable conical halves oriented in a horizontal manner in the water while attached to the fishing line at one end by a releasable spring member. The bobber contains in one half a flashlight battery which is connected by a coil spring to a movable light bulb adjacent a movable weight in the other half. As the fish strikes, the bobber is tilted to move the weight to cause the bulb and battery to contact each other to emit light. The fish signal device is distinguishable for its battery and light enclosed bobber.

None of the above inventions and patents, taken either singly or in combination, is seen to describe the instant invention as claimed.

SUMMARY OF THE INVENTION

The fishing alarm device operates as a visual indicator to a fisherperson that a fish has bitten. The device is comprised of a simple plastic container, preferably a 16 oz. plastic cylinder, similar to a soda bottle, a string attached to the mouth of the bottle, and a coupler attached to the opposite end of the string. The coupler attaches to an eyelet of a fishing pole. After a fisherman casts a line and anchors the fishing pole, the container is placed over the tip of the pole, causing a light crimping of the casting line near the tip of the pole, such that the line makes two 180 degree turns at the pole tip. When a fish is caught, tension in the line causes the line to suddenly straighten, resulting in an outward force by the fishing line against the mouth of the bottle. As a result, the bottle propels off the end of the pole and dangles from the eyelet, thereby signaling to the fisherman that a fish has been caught. Thus, a fisherman can determine from a substantial distance whether a fish has been caught, which is particularly useful in cold weather fishing, thereby allowing the fisherman to remain inside a cabin, automobile or tent until he gets a bite. The bottle can also be luminescent for night fishing.

Accordingly, it is a principal object of the invention to provide a simple, lightweight and easy to use fishing alarm to indicate to the fisherperson that a fish has bitten the bait.

It is another object of the invention to provide an indicator that can be readily attached and removed from the end of a fishing pole by a simple latch or hook closure device.

It is a further object of the invention to provide a fishing alarm/indicator that can be readily seen from a significant distance, such as 100 yards, and that can also be illuminated for night viewing.

Still another object of the invention is to provide a fishing alarm/indicator that is not directly attached to the fishing line.

It is an object of the invention to provide improved elements and arrangements thereof in an apparatus for the purposes described which is inexpensive, dependable and fully effective in accomplishing its intended purposes.

BRIEF DESCRIPTION OF THE DRAWINGS

FIGS. 3A, 3B, 3C, 3D and 3E are elevational views of variations of coupler embodiments used for connecting the fishing alarm device according the present invention to an eyelet of the fishing pole shown partially.

Similar reference characters denote corresponding features consistently throughout the attached drawings.

DETAILED DESCRIPTION OF THE PREFERRED EMBODIMENT

The present invention is an alarm device that operates as an visual indicator to a fisherperson that a fish has been caught. The device is comprised of a simple plastic container, a string, and an attachment/closure device.

Figure 1:
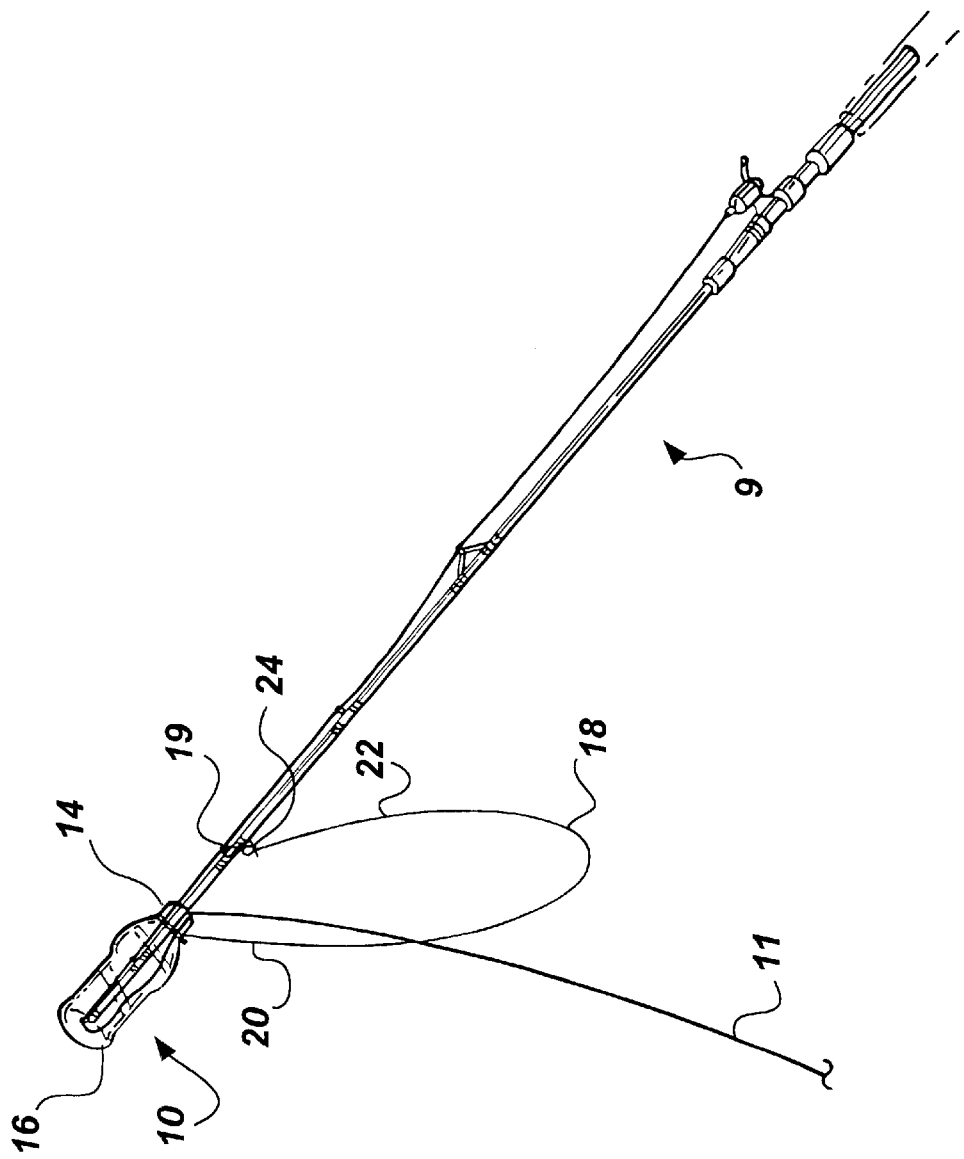
FIG. 1 is an environmental, elevational view of a fishing alarm device according the present invention and used with a fishing pole prior to hooking a fish.

FIG. 1 depicts the preferred embodiment of the fish alarm device located on a fishing pole 9 having a fishing line 11. The fish alarm device includes a container 10, preferably a 16 oz. plastic cylinder or bottle, or the like, having an opening 12, a neck 14 and a hollow chamber 16. While the container 10 can be translucent or even colored for greater ease of identification. It is preferably luminescent, such as having fluorescent markings for night time identification. The container 10 is preferably at least six inches in length, because a shorter container is more susceptible to wind forces that would blow the container 10 off the pole 9. The bottle opening or mouth 12 preferably has a diameter about the size of a quarter. Opening 12 must be large enough to evade any drag by an outermost eyelet against container 10, as container 10 is projected off of the tip of the fishing pole 9. However, the opening 12 can have a slightly larger diameter, but it must be small enough to avoid excessive vulnerability to lifting off by a wind. The container 10 can also be fitted with a light, a siren, a bell or other alarm to complement the indicating effect of the cylinder.

Figure 2:
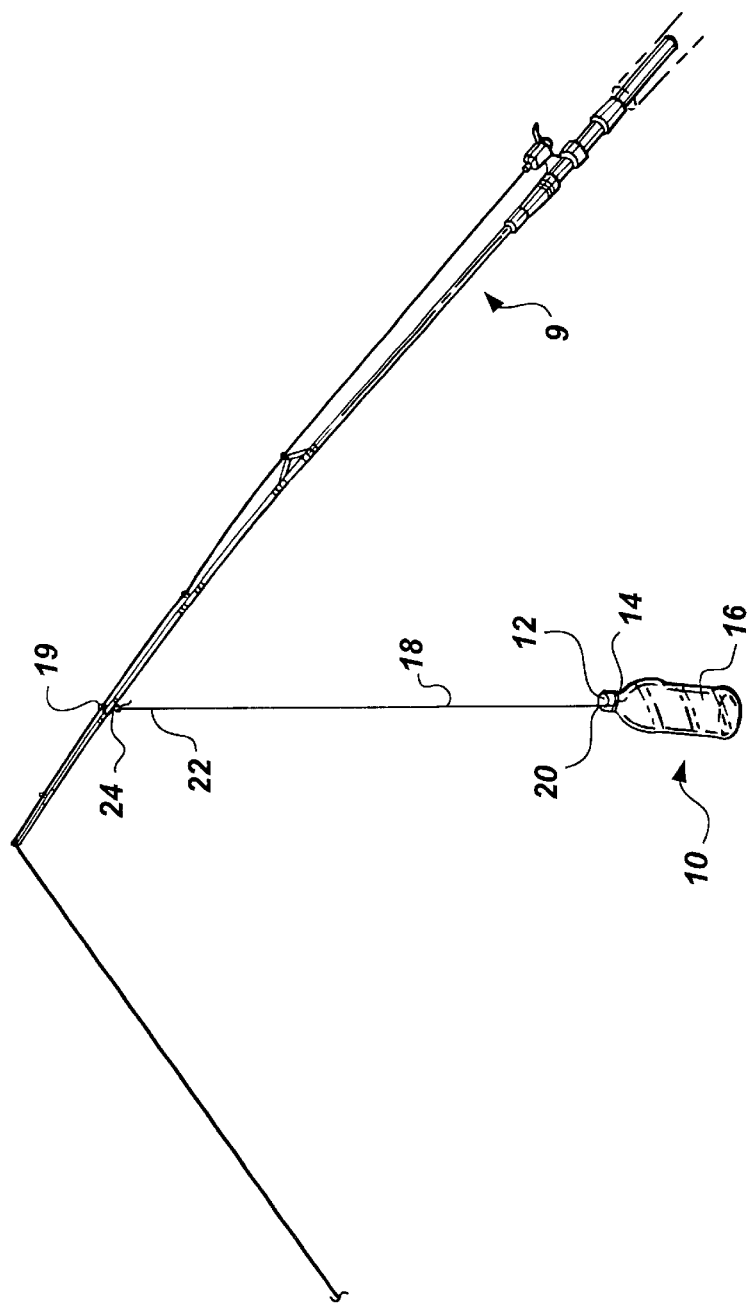
FIG. 2 is an environmental, elevational view of the fishing alarm device according the present invention and the fishing pole after the fish has bitten the baited hook or has been hooked.

As best shown in FIG. 2, a string 18 having a first end 20 is attached to the neck 14 of the container 10, and a second end 22 is connected to a generic coupler 24. The string 18, or similar attachment device, can be made of cotton, nylon, neoprene or any suitable material that can support a light weight plastic bottle. Preferably, the string 18 is water resistant and fluorescent.

The generic coupler 24, preferably metal, attaches to the second end 22 of string 18 to an eyelet 19 proximate a tip of fishing pole 9. The coupler. 24 has a link end 26 attached to second end 22 of string 18, and a coupling end 28 coupled to eyelet 19.

Figure 3E:
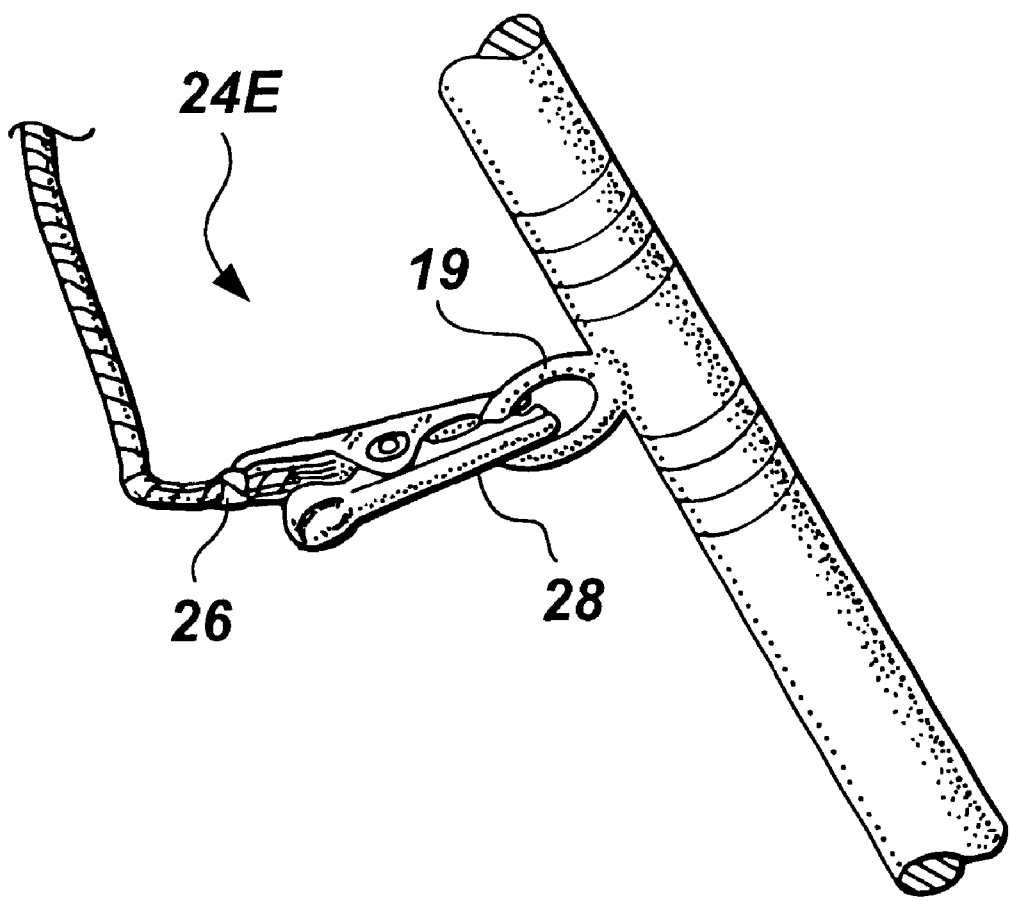

The generic coupler 24 can also be made of plastic. The generic coupler 24 is preferably a rigid hook-type 24A as shown in FIG. 3A. However, the generic coupler 24 can also be a sliding lock ring mechanism 24B as, for example, shown in FIG. 3B. The generic coupler 24 can also be a coil-type key ring 24C as shown in FIG. 3C, a trigger snap type 24D, as shown in FIG. 3D, or an alligator clip 24E, as shown in FIG. 3E.

As seen in FIG. 1, after a fisherman casts the line 11 and anchors the pole 9, the bottle 10 is placed over the tip of the pole, causing a light crimping of the casting line 11 near the tip of the pole 9, such that the line 11 makes two 180° turns in and about the bottle 10 and the pole tip. As seen in FIG. 2, when a fish is caught, the part of the line 11 captured by the bottle 10 extends and straightens to a single angle of 180° or less. This sudden change in, or tensioning of the line 11 causes the bottle 10 to be propelled off the end of the pole 9, thereby signaling visually to the fisherman that a fish has bitten or has been caught.

Other possible modifications of the bottle 10 can include (1) a false bottom filled with air to make the bottle sink proof, and for better night vision, (2) coloring the bottle a fluorescent color or adding a fluorescent material inside, and (3) to make the string 18 fluorescent.

One of the many advantages of this device is to allow a fisherman to determine visually from a substantial distance whether or not a fish has been caught. Such an advantage is particularly useful in cold weather fishing, thereby permitting the fisherman to stay inside a cabin, an automobile, tent or the like, until a fish has bitten or is actually caught.

It is to be understood that the present invention is not limited to the sole embodiments described above, but encompasses any and all embodiments within the scope of the following claims.

We claim:

1. A fishing rod and fish strike indicator assembly comprising:

a fishing rod having a tip end and at least one eyelet spaced apart from the tip end, said fishing rod including a fishing line passing through the at least one eyelet and extending from the tip end; and a cylindrical container having a closed end and an open neck end, said container including a string having a first end attached to the open neck end and a second end attached to the at least one eyelet of said fishing rod;

whereby, the open neck end of the container is placed over the tip end of the fishing rod after casting the fishing line and anchoring the fishing rod, such that tension on the fishing line causes the container to be propelled off the tip end of the fishing rod and dangle from the eyelet, thereby signaling that a fish has been caught.

2. The fishing rod and fish strike indicator assembly according to claim 1, wherein said container is a plastic bottle.

3. The fishing rod and fish strike indicator assembly according to claim 1, wherein said container is luminescent.

4. The fishing rod and fish strike indicator assembly according to claim 1, wherein the a second end of the string is removably attached to the at least one eyelet by a coupler.

* * * * *